United States Patent

Yoshizawa et al.

[11] Patent Number: 5,579,508
[45] Date of Patent: Nov. 26, 1996

[54] MAIN MEMORY MANAGING METHOD AND APPARATUS IN WHICH MAIN MEMORY IS PARTITIONED INTO THREE DISTINCT AREAS

[75] Inventors: Ryokichi Yoshizawa, Hitachi; Tomoaki Nakamura, Katsuta; Shigenori Kaneko, Nakaminato, all of Japan

[73] Assignee: Hitachi, Ltd., Tokyo, Japan

[21] Appl. No.: 293,334

[22] Filed: Aug. 24, 1994

Related U.S. Application Data

[63] Continuation of Ser. No. 660,886, Feb. 26, 1991, abandoned.

[30] Foreign Application Priority Data

Mar. 8, 1990 [JP] Japan ................................. 2-55136

[51] Int. Cl.⁶ .................................................... G06F 12/02
[52] U.S. Cl. ........................ 395/497.03; 395/497.01; 395/674; 395/480; 364/DIG. 1
[58] Field of Search .................. 364/DIG. 1, DIG. 2, 364/962, 963.1, 963.2, 963.3, 966.1, 965.8, 967.4; 395/425, 600, 497.01, 497.03, 480, 650

[56] References Cited

U.S. PATENT DOCUMENTS

| | | | |
|---|---|---|---|
| 4,390,945 | 6/1983 | Olsen et al. | 395/437 |
| 4,403,283 | 9/1983 | Myntti et al. | 395/402 |
| 4,811,216 | 3/1989 | Bishop et al. | 395/480 |
| 4,996,662 | 2/1991 | Cooper et al. | 395/600 |
| 5,062,039 | 10/1991 | Brown | 395/650 |

FOREIGN PATENT DOCUMENTS

| | | |
|---|---|---|
| 61-54548 | 3/1986 | Japan . |
| 62-177644 | 8/1987 | Japan . |

*Primary Examiner*—Tod R. Swann
*Assistant Examiner*—James Peikari
*Attorney, Agent, or Firm*—Antonelli, Terry, Stout & Kraus

[57] ABSTRACT

A main memory managing arrangement involves allotting a request program to one of three distinct areas of main memory by looking in an area managing table which stores head addresses and the capacities of the respective areas. The areas allocated in main memory correspond to a single OS area, a single first class program area and a single second class program area. An empty page managing table is also provided for indicating the presence or absence of an empty area conformable to a request in an allocated area. A request program is allocated to the allocated area when the presence of the empty area of required capacity is determined. The memory capacity for a resident program can be assured independently of the memory capacities for other programs to enhance reliability conformable to real-time process computers.

16 Claims, 7 Drawing Sheets

| FIRST CLASS PROGRAM | SECOND CLASS PROGRAM | CRITERIA FOR CLASSIFICATION |
|---|---|---|
| RESIDENT PROGRAM | NON-RESIDENT PROGRAM | CAPABILITY OR INCAPABILITY OF SWAP-OUT TO AUXILIARY STORAGE UNIT |
| ONLINE PROGRAM | OFFLINE PROGRAM | HAVING OR NOT HAVING INFLUENCE UPON A CONTROL OBJECT SUCH AS PLANT |
| HIGH PRIORITY PROGRAM | LOW PRIORITY PROGRAM | LEVEL OF PRIORITY |
| STATIC ALLOCATION PROGRAM | DYNAMIC ALLOCATION PROGRAM | MEMORY ALLOCATION IS DEFINED IN ADVANCE (THE FORMER) OR DETERMINED UPON PROGRAM EXECUTION (THE LATTER) |
| MIDDLE SOFTWARE | APPLICATION SOFTWARE | BASIC SOFTWARE ANNEXED TO OS (SUCH AS WINDOW MANAGEMENT AND DATA HASE MANAGEMENT) OR CUSTOM MADE SOFTWARE |
| THIRD PARTY PROGRAM | CUSTOM MADE PROGRAM | BOUGHT AND SOLD AS MERCHANDISE OR POSSESSED BY AN INDIVIDUAL |

MAIN MEMORY MANAGING METHOD AND APPARATUS IN WHICH MAIN MEMORY IS PARTITIONED INTO THREE DISTINCT AREAS

This application is a continuation application of Ser. No. 07/660,886, filed Feb. 26, 1991, now abandoned.

BACKGROUND OF THE INVENTION

The present invention generally relates to a paging type virtual storage computer system for executing a multiprogram, including an operating system program (abbreviated as OS), a resident program group and a non-resident program group. The invention relates more particularly to a method and apparatus of managing a main memory under the direction of the OS when the main memory is dynamically allocated to or released from programs in the computer system.

As shown in U.S. Pat. No. 4,811,216 and JP-A-61-54548, a main memory managing method in a multiprogram system has hitherto been known, wherein a main memory is logically divided into an area for storing an OS and a resident program group and an area for storing a non-resident program group, and upon execution of a program, the main memory is accessed in only an area associated with that program under the control of the OS. With this prior art method, even in the event that, for example, a non-resident program goes into a runaway condition to cause the main memory to be used to a great extent, this merely results in an abnormal ending of the non-resident program, and had no influence upon the operation of the OS and the resident program group. JP-A-62-177644 discloses another known method, according to which a bank memory (auxiliary memory) accessible directly from a processor is provided and the execution area is shared by storing an OS and resident programs in a main memory and by storing non-resident programs in the bank memory. With the latter method, resident programs are stored in the main memory and non-resident programs are stored in the bank memory, whereby the resident programs can be executed using the main memory alone and the non-resident programs can be executed using the bank memory alone,. Therefore, for example, when it is desired to enlarge the execution area of the non-resident programs, the enlargement can be done by merely providing an additional bank memory, with the result that the main memory, i.e., the execution area of the OS and resident programs, will not be oppressed, thereby facilitating function/performance extension of a terminal system to which this latter method is applied.

Disadvantageously, the aforementioned method of JP-A-6154548 does not take into account distinct separation of the main memory used by the OS and resident program group. In enlarging the input/output unit or extending the function of the OS, the capacity to be used by the OS is sometimes increased. In such an event, an increase in the capacity of main memory used by the OS causes the main memory to come short of idle capacity during online operation of the computer system, giving rise to a possibility that the resident programs may be forced to operate abnormally. The method of JP-A-62-177644 suffers from the same problem as that encountered in the aforementioned JP-A-61-54548 and besides, it requires the bank memory and the hardware which is adapted to transfer the control to the non-resident program loaded in the bank memory and fails to take into account the storing of resident and non-resident programs in the main memory, raising a problem that this prior art method cannot be applied to a computer system without the aforementioned hardware.

SUMMARY OF THE INVENTION

An object of the present invention is to provide a main memory managing method and apparatus which can perform control, such that even when the memory capacity used for any one of an OS, a resident program group and a non-resident program group varies, the variation does not influence the memory operation for the remaining program groups.

According to a first aspect of the invention, to accomplish the above object, means is provided for defining memory areas in which an OS, a resident program group and a non-resident program are stored and the main memory is allocated or shared at only an area associated with each program group under the control of the OS.

According to a second aspect of the invention, means is provided for defining main memory capacities allotted to an OS, a resident program group and a non-resident program group and such that the main memory is allocated a capacity which does not exceed a capacity associated with each program group under the control of the OS.

In accordance with a first aspect of the invention, when any one of the OS, resident program and non-resident program seizes the main memory, the OS identifies an area of the main memory which is usable by a program of interest. If a requested space is present in the corresponding area, the main memory is accessed at the requested space, but if no space is present, the request is treated as an abnormal processing. When one of the OS, resident program and non-resident program releases the main memory, the OS identifies the area of the main memory used by the program of interest and sets the main memory to be empty at the identified area thereof.

In accordance with a second aspect of the invention, when any one of the OS, resident program and non-resident program seizes the main memory, the OS identifies a maximum capacity of the main memory which is usable by a program of interest. As a result, if the quantity used by the main memory does not exceed the maximum quantity, the memory is accessed at a space but if the maximum quantity is exceeded, the request is treated as an abnormality and ended. When one of the OS, resident program and non-resident program releases the main memory, the OS manages the main memory such that the main memory is empty at the program, identifies a released main memory capacity and subtracts a value of the released capacity from the currently used quantity of the main memory, In this manner, any one of the OS, resident program and non-resident program can be operated using only an area of the main memory dedicated to any one of the OS, resident program group and non-resident program group, thereby preventing the change and operation of one program from affecting a program of a different area.

DESCRIPTION OF THE PREFERRED EMBODIMENTS

A preferred embodiment of the invention will now be described with reference to the accompanying drawings.

Figure 1:
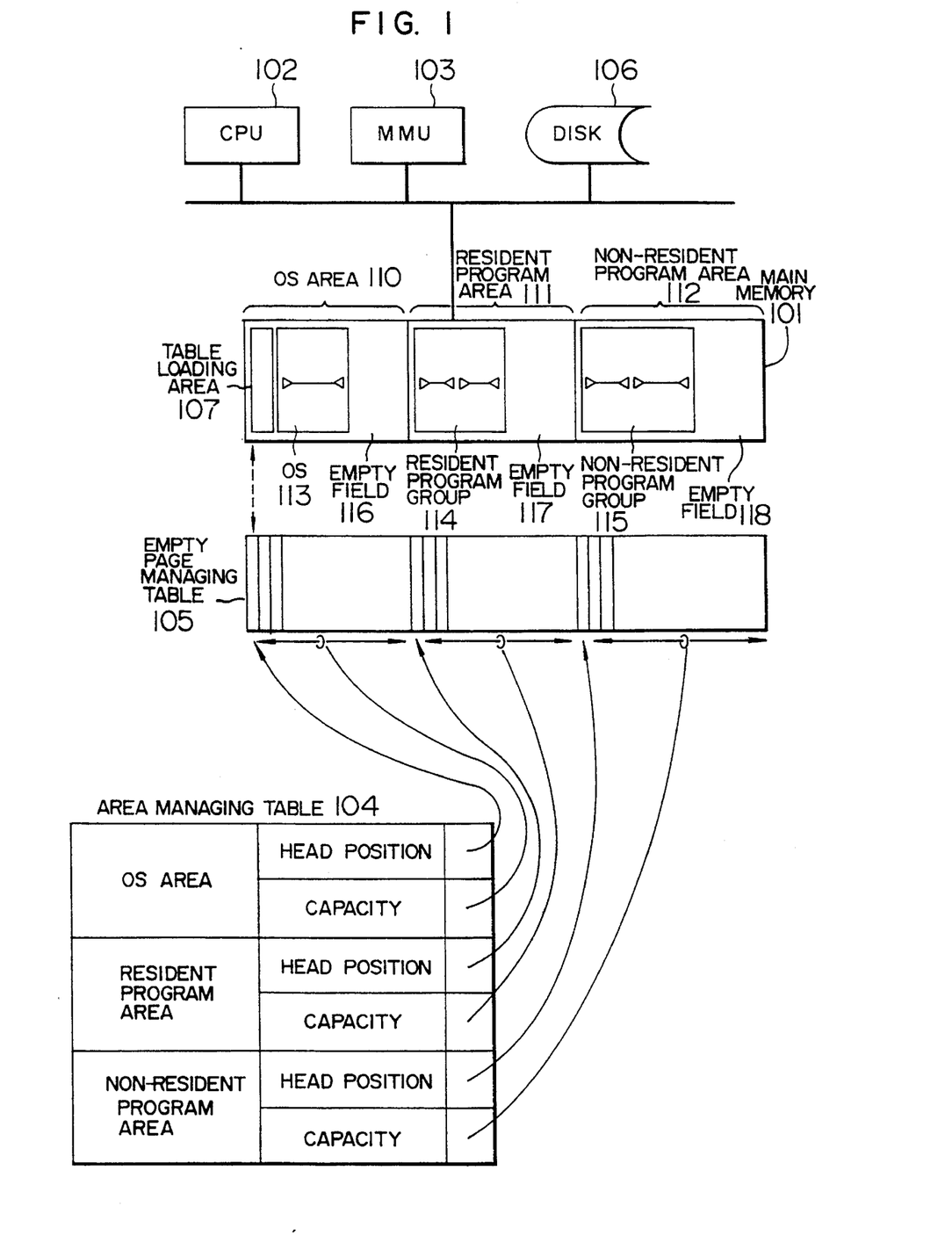
FIG. 1 is a schematic diagram showing the construction of a first embodiment of the invention.
Figure 7:
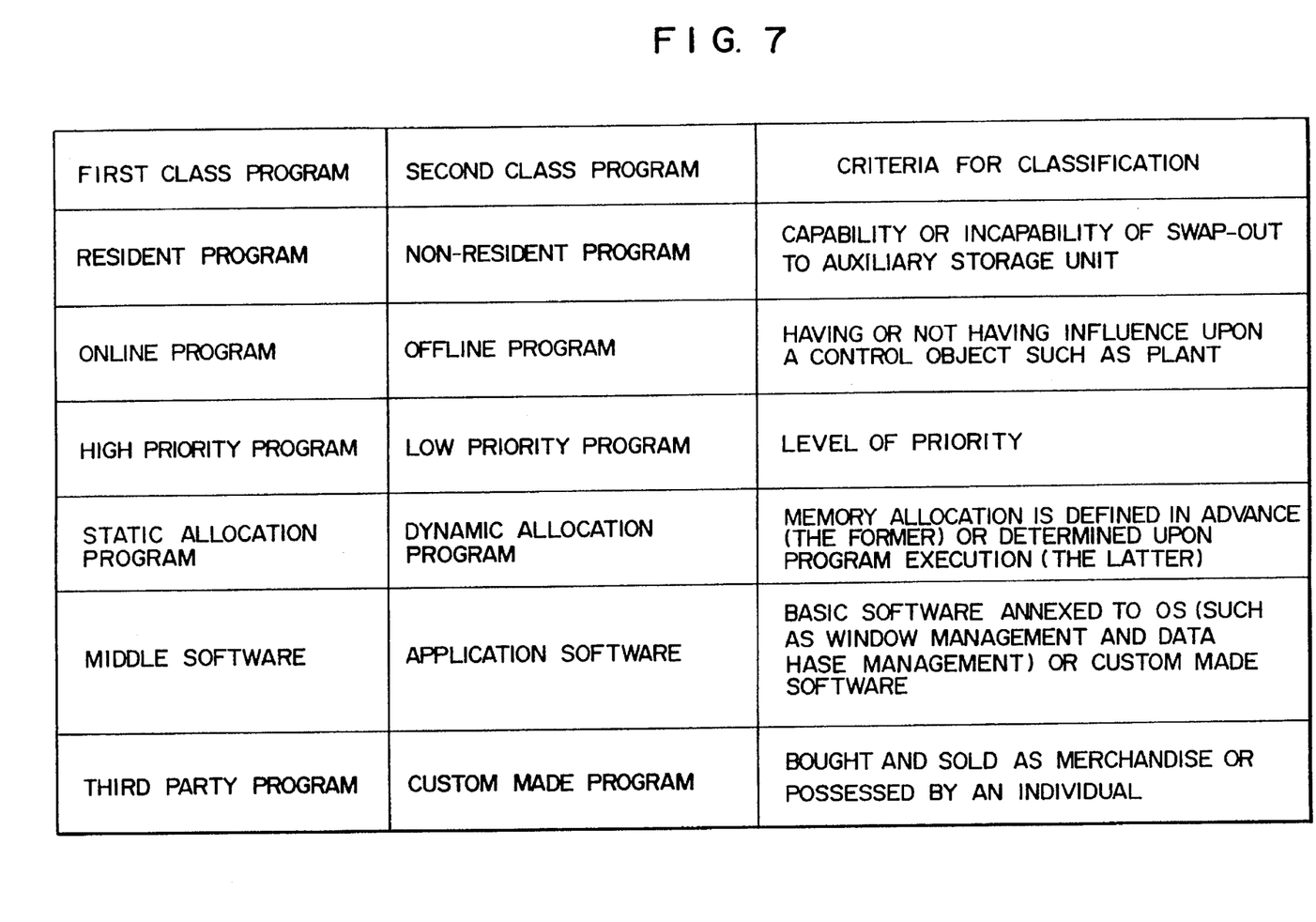
FIG. 7 is a table showing various kinds of programs used in the present invention.

FIG. 1 is a diagram showing an example of the construction of a paging type virtual storage computer system according to a first aspect of the invention. In the computer system, a paging mechanism for a main memory 101 is supported by a memory managing unit 103, and an empty page managing table 105 is provided which records information as to whether individual pages of the main memory are busy or not. An OS manages an OS dedicated area 110, a resident program dedicated area 111 and a non-resident program dedicated area 112 in the main memory by recording on an area managing table 104 information as to which ranges on the empty managing table 105 the above dedicated areas correspond to. The resident program (called a first class program) and the non-resident program (a second class program) may be classified into various kinds of programs as shown in a table of FIG. 7. The empty managing table 105 and area managing table 104 are stored in a head area 107 of the main memory. Upon start-up of the system, an instruction part of the OS is loaded from a disk 106 and in advance of this loading, initial values of these tables are also loaded from the disk. The OS 113, a resident program group 114 and a non-resident program group 115 are respectively stored in the areas of the main memory. During the stationary state of online operation, the main memory is idle at empty fields 116 to 118 in the individual areas. Practically, the user designates which program is resident and which program is nonresident. Individual programs in each of the OS 113, resident program group 114 and non-resident program group 115 are executed by using a CPU 102 a time division basis.

Figure 2:
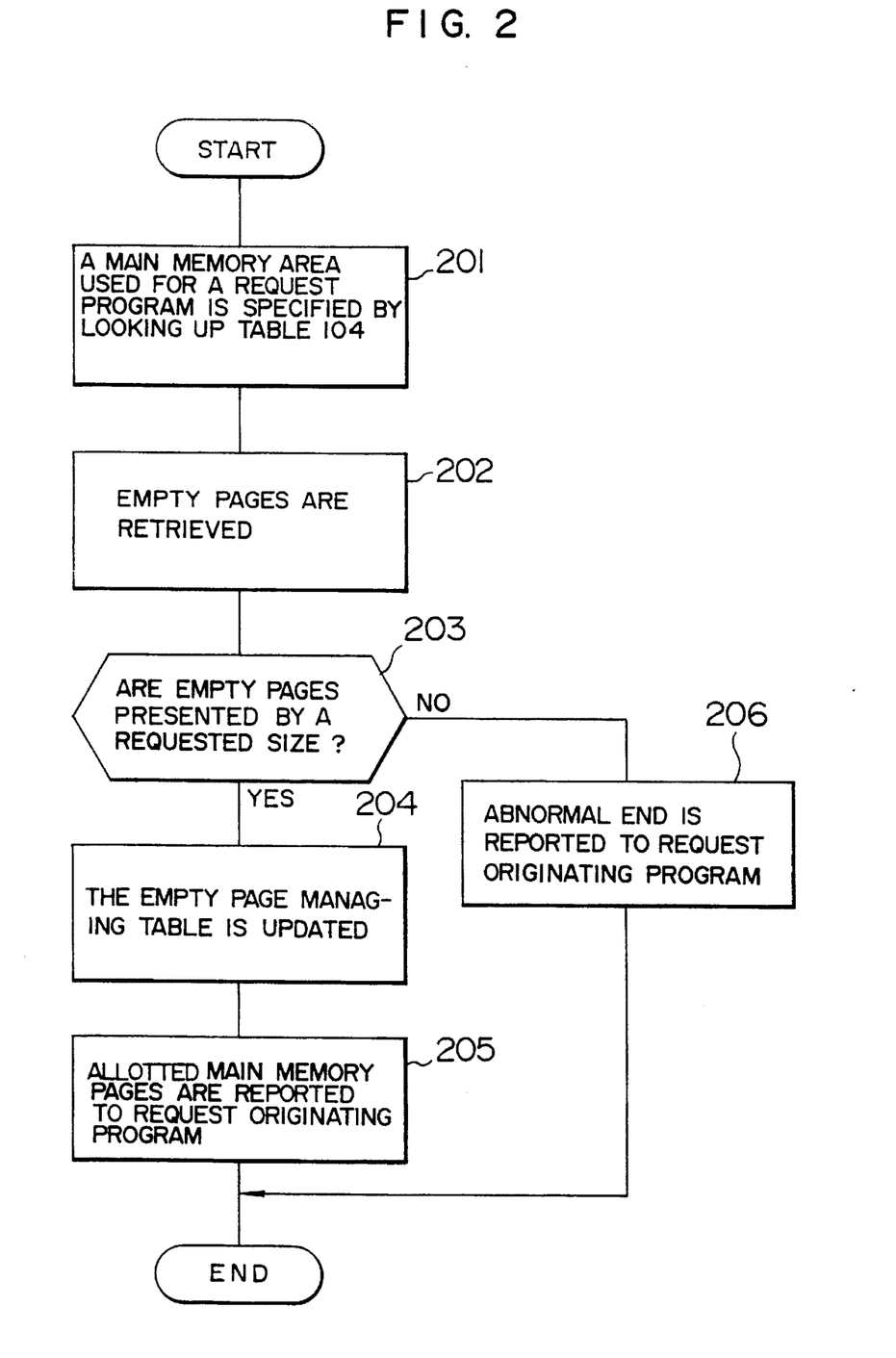
FIG. 2 is a flow chart showing the process procedure for causing the OS to allot three areas in the first embodiment.

FIG. 2 shows a flow of the process procedure carried out by the OS when the main memory is allocated to one of the OS, resident program and non-resident program. Firstly, in step 201, a main memory area standing for an object to be processed is specified by looking in the area managing table 104. Subsequently, in steps 202 and 203, the empty managing table 105 is looked up to retrieve empty pages and decide whether the empty pages correspond to a requested size. If empty pages are present in the requested size, the program proceeds from step 203 to step 204. In step 204, an entry of interest in the empty managing table 105 is registered to be busy and in step 205, allotted main memory pages are reported to a main memory request originating program. If empty pages in the requested size are not available, an abnormality is reported to the main memory originating program in step 206.

Figure 3:
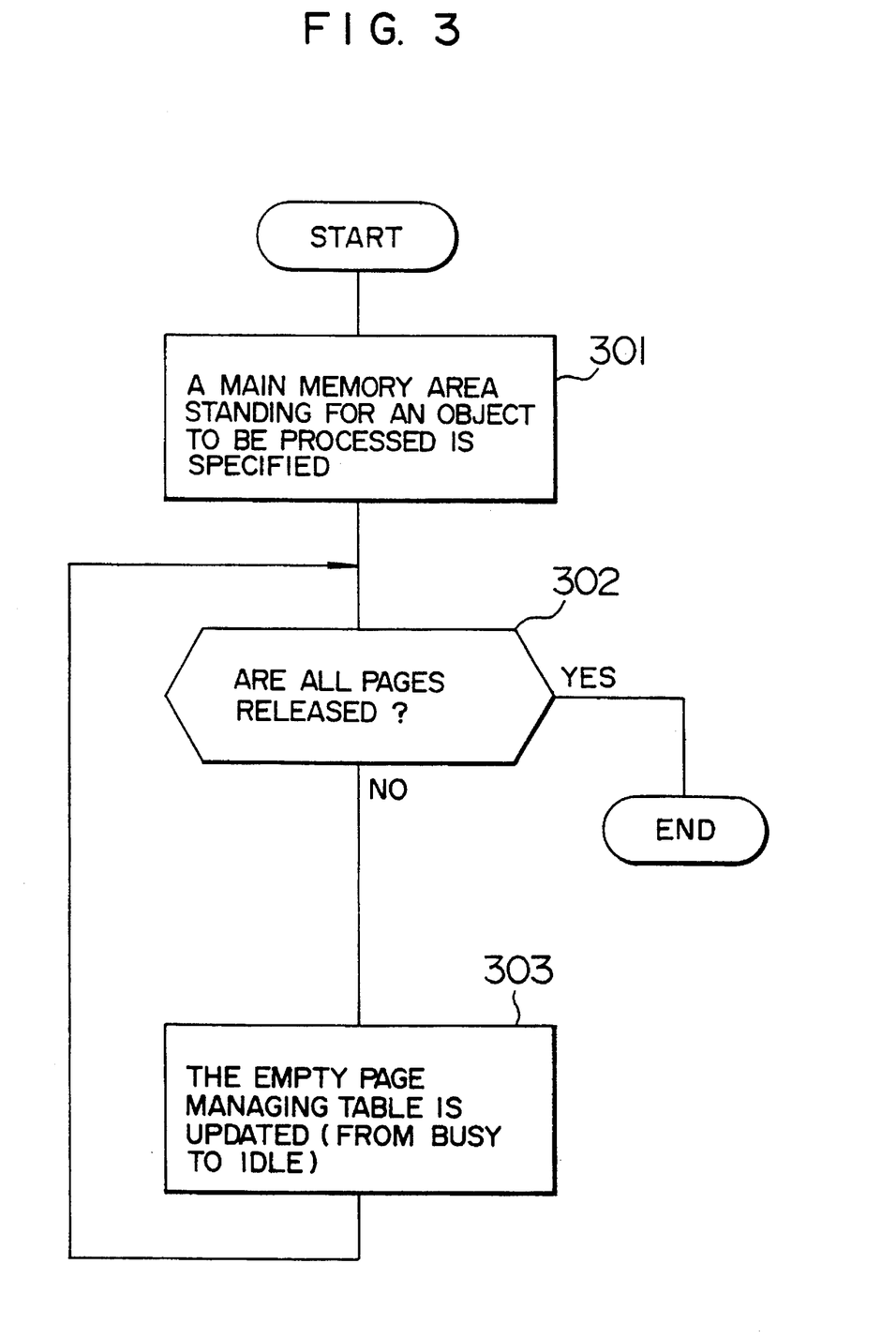
FIG. 3 is a flow chart showing the process procedure for causing the OS to release the three areas in the first embodiment.

FIG. 3 shows a flow of the process procedure carried out by the OS when the main memory is released from one of the OS, resident program and non-resident program. Firstly, in step 301, a main memory area corresponding to a program issuing a release request is specified by looking up the area managing table 104. Subsequently, steps 302 to 303 are repeated to effect release of release requested pages and to carry out update process by which an entry of interest in the empty managing table 105 is registered to be idle.

In accordance with the present embodiment, the main memory is divided into three areas for the OS, resident program and non-resident program which are bounded at predetermined positions on the main memory so that each program may be executed in only a corresponding area and therefore even in the event that the non-resident program, for example, consumes the main memory unduly, the execution of the OS and resident program will not be affected adversely. The capacity of the area managing table 104 is not fixed but may be variable depending on a user's request.

Figure 4:
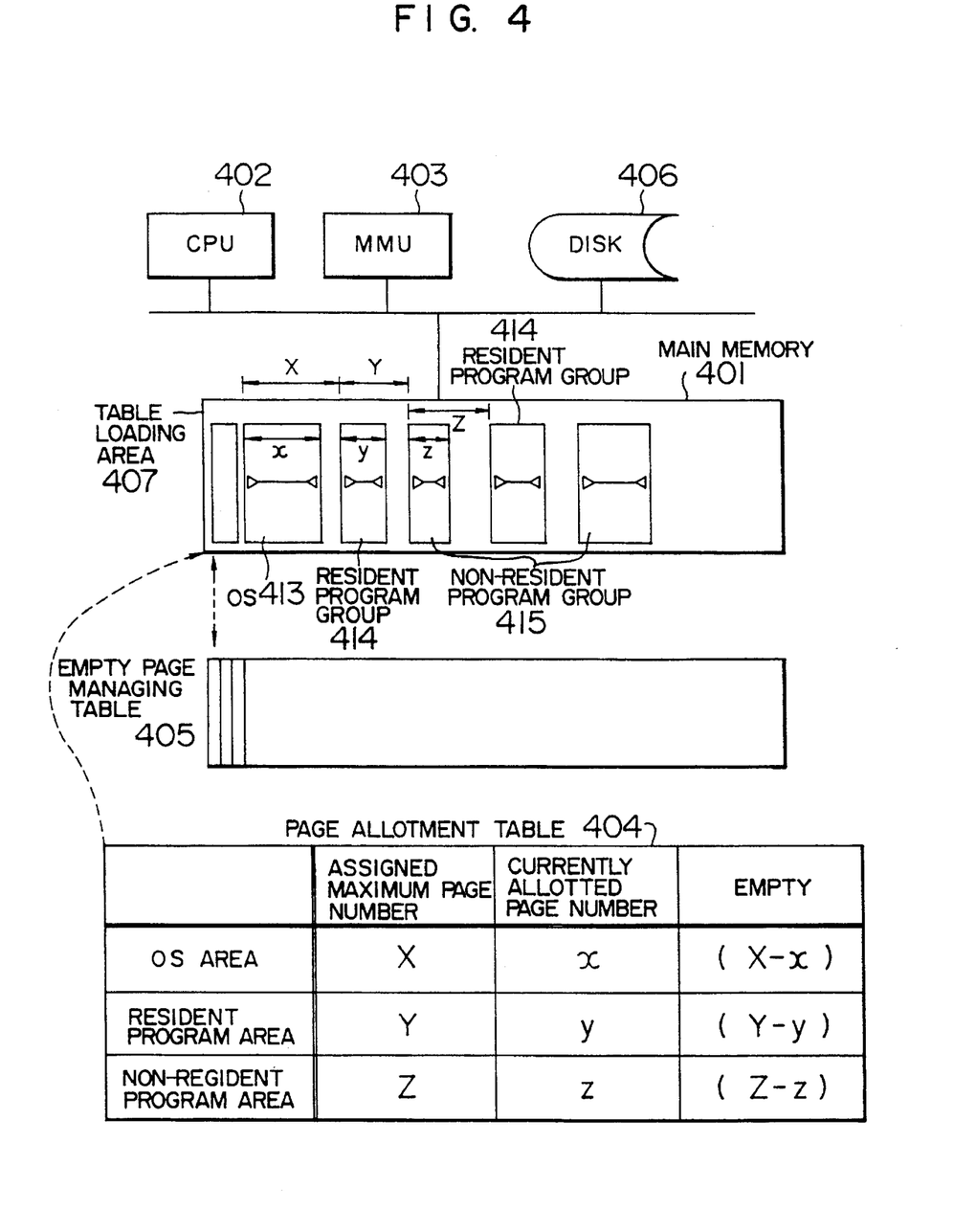
FIG. 4 is a schematic diagram showing the construction of a second embodiment of the invention.

FIG. 4 shows an example of the construction of a computer system according to a second aspect of the invention. In this computer system, a paging mechanism for a main memory 401 is supported by a memory managing unit 403, and an empty page managing table 405 is provided which records information as to whether individual pages of the main memory are busy or not. An OS manages maximum main memory page numbers X, Y and Z respectively assigned to the OS, a resident program group and a non-resident program group and currently allotted main memory page numbers x, y and z by recording these numbers on a page allotment table 404. The empty page managing table 405 and page allotment table 404 are stored in a head area 407 of the main memory. Upon start-up of the system, an instruction part of the OS is loaded from a disk 406 and in advance of this loading, initial values of these tables are also loaded. Stored in the main memory are the OS, 413, resident program groups 414 and non-resident program groups 415. During the stationary state of online operation, values of the currently alloted page numbers x to z are smaller than those of the assigned maximum main memory page numbers X to Z, respectively.

Figure 5:
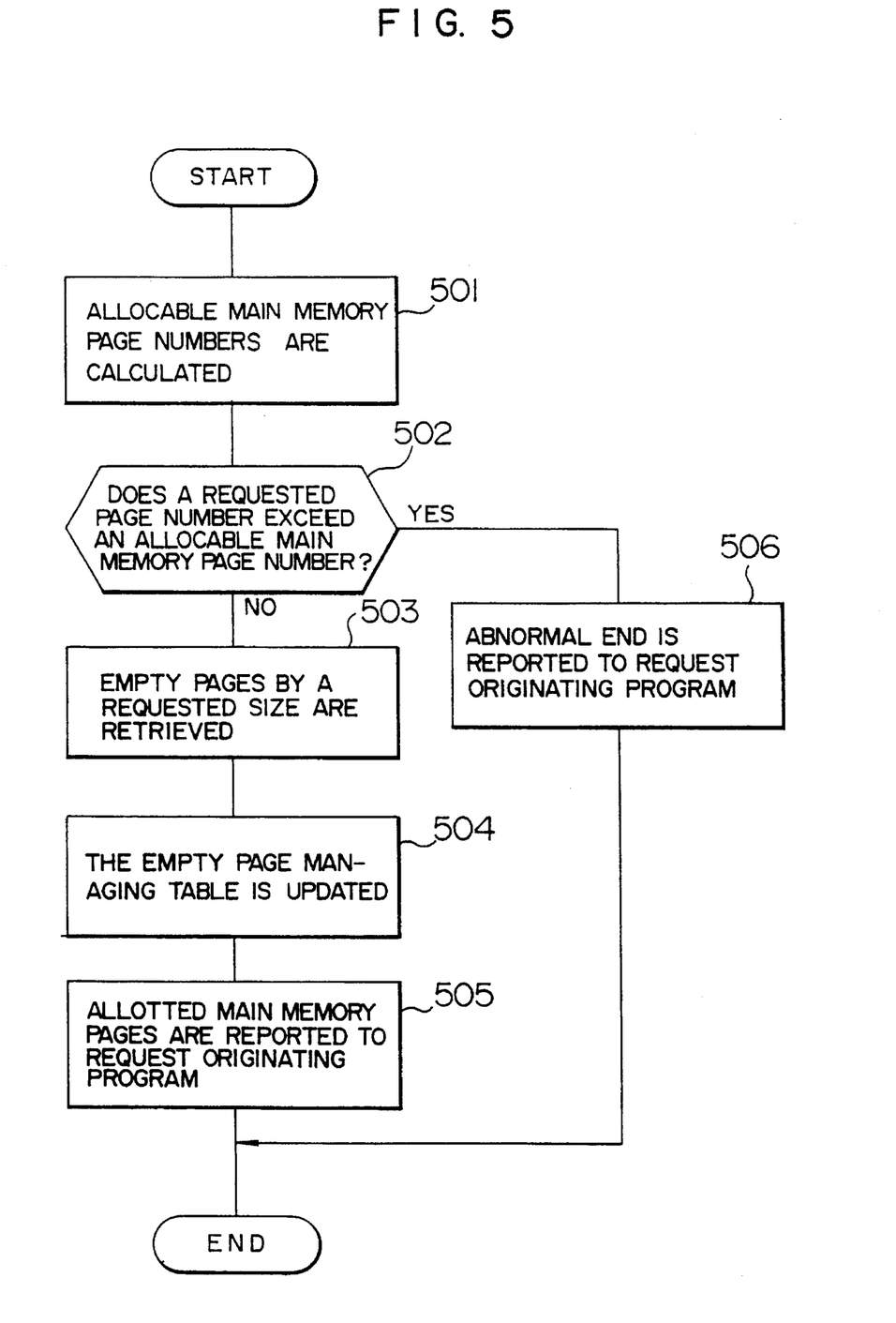
FIG. 5 is a flow chart showing the process procedure for causing the OS to allot three areas in the second embodiment.

FIG. 5 shows a flow of the process procedure carried out by the OS when the main memory is allocated to one of the OS, resident program and non-resident program. Firstly, in step 501, main memory page numbers currently allocable to a main memory request originating program are calculated by looking up the page allotment table 404. The numbers can be determined by subtracting currently used main memory page numbers x to z from allocable maximum main memory page numbers X to Z. Subsequently, in step 502, it is decided whether a requested page number exceeds a currently allocable page number. If the currently allocable page number is not exceeded, the empty page managing table 405 is looked up to access the main memory in step 503, an entry of interest in the empty managing table is registered to be busy in step 504 and allotted main memory pages are reported to the main memory request originating program in step 505. If empty pages in a requested size are not available, an abnormality is reported to the main memory request originating program in step 506.

Figure 6:
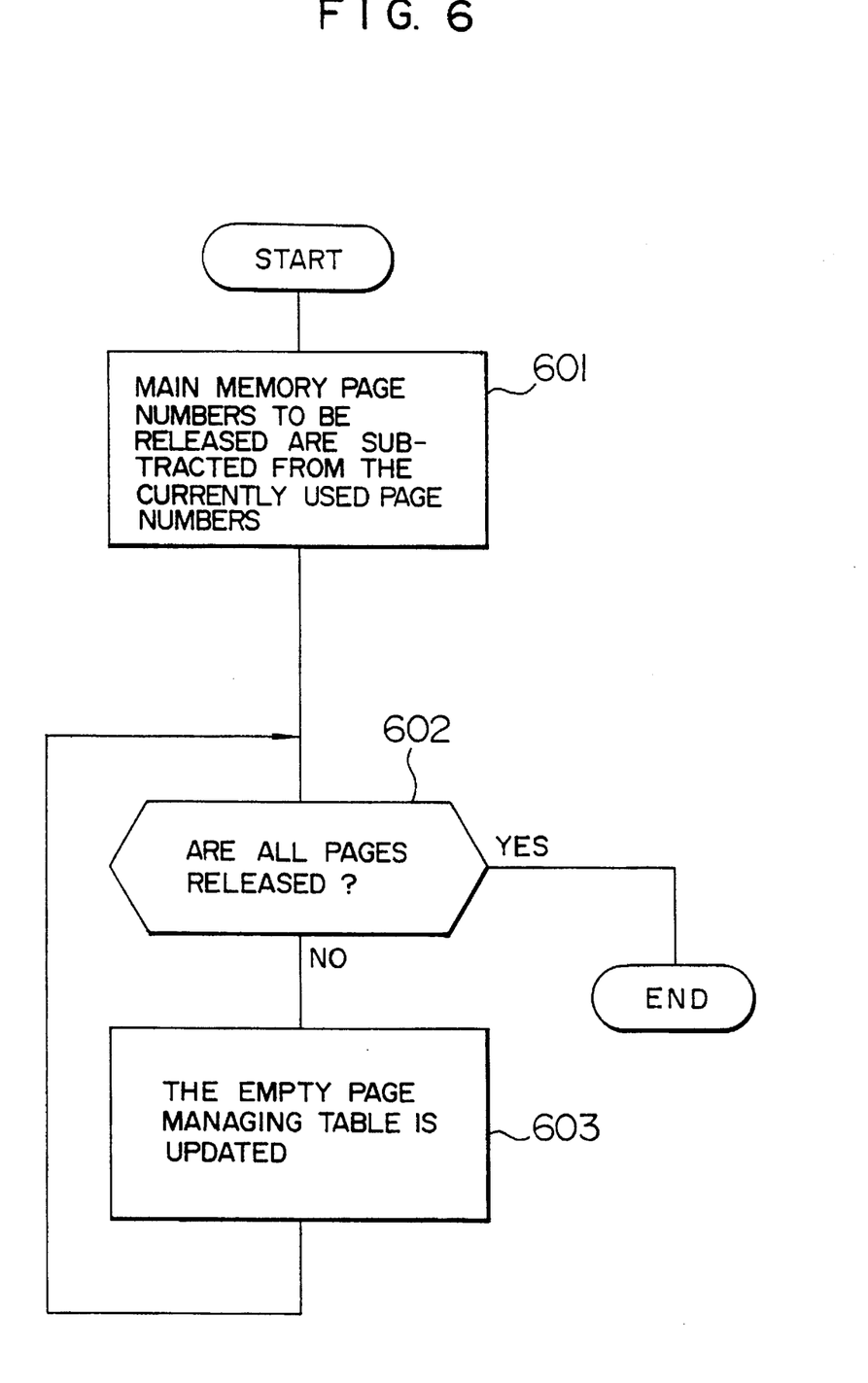
FIG. 6 is a flow chart showing the process procedure for causing the OS to release the three areas in the second embodiment.

FIG. 6 shows a flow chart of the process procedure carried out by the OS when the main memory is released from one of the OS, resident program and non-resident program. Firstly, in step 601, an entry in page allotment table 405 corresponding to a release request originating program is specified and main memory page numbers to be released are subtracted from the currently used page numbers x to z. The succeeding steps 602 and 603 are repeated by the number of pages to be released. In step 603, entries in the empty managing table corresponding to the main memory pages to be released are registered to be idle.

In accordance with the present embodiment, the main memory is divided into three areas for the OS, resident program and non-resident program on the basis of the capacities defined on the page allotment table 404 so that each program may be executed only within the range of a corresponding capacity and therefore even in the event that the non-resident program, for example, consumes the main memory unduly, the execution of the OS and resident program will not be affected adversely.

According to the present invention, since main memory areas to be allotted to the OS, resident program and non-resident program are assured in advance so that an area may be prevented from being used by a different area program group under the control of the OS, the user can perform programming debug and test without taking into account the main memory quantities used by the other program groups to improve the productivity of software. In particular, the resident program is frequently prepared for a real-time process in which a desired processing must be executed rapidly for an event and therefore by making the main memory quantity available by the resident program independent of the main memory quantity available by the OS and nonresident program as in the present invention in order that the main memory capacity to be used by the resident program group is never used by the non-resident program group and the OS, dependability conformable to real-time process computers can be enhanced to assure reliability thereof to advantage. In addition, even when the capacity of the OS is increased by swapping (for example, updating the version of the OS), the main memory capacities available by the resident program group and the non-resident program group remain unchanged after swapping of the OS, with no adverse influence upon the operation of the system.

We claim:

1. A method of managing a main memory in response to a request to execute a program, comprising the steps of:

(a) allotting the program to one of three distinct areas of main memory by using data in an area managing table, which stores head addresses and capacities of the respective three distinct areas, to identify an allocated area for the program within one of the three distinct areas, said areas in the main memory being a single OS area, a single first class program area and a single second class program area, respectively;

(b) retrieving an indication of the presence or absence of an empty storage space conforming to requirements of the program in said allocated area, wherein the indication of an empty storage space is provided only for the one of the three distinct areas in which the allocated area is located, independent of the other two distinct areas;

(c) allotting said program to said allocated area when the presence of a conforming empty storage space in said allocated area is determined through said step (b); and (d) abandoning efforts to allot said program to main memory when no conforming empty storage space in said allocated area an be determined through said step (b).

2. A main memory managing method according to claim 1, wherein in said step (b), an empty page managing table is utilized to determined presence or absence of an empty storage space.

3. A main memory managing method according to claim 1, wherein said first class program area stores a resident program and a second class program area stores a non-resident program.

4. A method according to claim 1, wherein the data regarding the capacities of the respective three distinctive areas used by said area management table is variable by a user.

5. A method of managing a main memory in response to a request to execute a program, comprising the steps of:

(a) allotting the program to an allocated area in one of three distinct areas of main memory using data in a managing area table which stores head addresses and capacities of the respective three distinct areas, said three distinct areas in main memory being defined by dividing the entire area of the main memory into a first area having a plurality of OS areas, a second area having a plurality of first class program areas and a third area having a plurality of second class program areas;

(b) retrieving an indication of the presence or absence of an empty area conforming to the requirements of the program in said allocated area, wherein the indication of an empty storage space is provided only for the one of the three distinct areas in which the allocated area is located, independent of the other two distinct areas;

(c) allotting said program to said allocated area when the presence of an empty area in said allocated area is determined through said step (b); and (d) abandoning efforts to allot said program to main memory when no conforming empty storage space in said allocated area can be determined through said step (b).

6. A main memory managing method according to claim 5, wherein in said step (b), an empty page managing table and a page allotment table are utilized to determine presence or absence of an empty area.

7. A main memory managing method according to claim 6, wherein said page allotment table stores an allocable maximum page number and an empty page number for each of said three distinct areas.

8. A main memory managing method according to claim 5, wherein a first class program area stores a resident program and a second class program area stores a non-resident program.

9. An apparatus for managing a main memory in response to a request to execute a program, comprising:

three distinct memory areas, comprising:
   a single OS area of predetermined size set within the entire area of said main memory;
   a single first class program area of predetermined size set within the entire area of said main memory; and
   a single second class program area of predetermined size set within the entire area of said main memory;

three-area allotment means for allotting the program to one of the three distinct areas set within main memory by using data in an area managing table, which stores head addresses and capacities of the respective three distinct areas, to identify an allocated area for the program within one of the three distinct areas;

retrieval means for retrieving an indication of the presence or absence of an empty storage space conforming to requirements of the program in said allocated area, wherein the indication of an empty storage space is provided only for the one of the three distinct areas in which the allocated area is located, independent of the other two distinct areas; and program allotment means for allotting said program to said allocated area when the presence of a conforming empty storage space in the allocated area is determined by said retrieval means and for abandoning efforts to allot said program to main memory when no conforming empty storage space in said allocated area can be determined by said retrieval means.

10. A main memory managing apparatus according to claim 9, wherein said request program allotment means utilizes an empty page managing table and said area managing table to determining presence or absence of a conformable empty storage space.

11. A main memory managing apparatus according to claim 9, wherein said first class program area stores a resident program and a second class program area stores a non-resident program.

12. An apparatus according to claim 9, wherein the data regarding the capacities of the respective three distinctive areas used by said area management table is variable by a user.

13. An apparatus for managing a main memory in response to a request to execute a program, comprising:

three distinct memory areas, comprising:
- a first type of area having a plurality of OS areas of predetermined size set within the entire area of said main memory;
- a second type of area having a plurality of first class program areas of predetermined size set within the entire area of said main memory; and
- a third type of area having a plurality of second class program areas a predetermined size set within the entire area of said main memory;

three-type area allotment means for allotting the program to one of the three distinct areas by using data in an area managing table, which stores head addresses and capacities of the respective three types of areas, to identify an allocated area for the program within one of the three distinct areas;

retrieval means for retrieving an indication of the presence or absence of an empty area conforming to requirements of the program in said allocated area; and program allotment means for allotting said program to said allocated area when the presence of a conforming empty area is determined by said retrieval means and for abandoning efforts to allot said program to main memory when no conforming empty storage space in said allocated area can be determined by said retrieval means.

14. A main memory managing apparatus according to claim 13, wherein said three-type area allotment means utilizes an empty page managing table and a page allotment table to determine presence or absence of a conformable storage area.

15. A main memory managing apparatus according to claim 13, wherein said page allotment table stores an allocable maximum page number and an empty page number for each of said three types of areas.

16. A main memory managing apparatus according to claim 13, wherein a first class program area stores a resident program and a second class program area stores a non-resident program.

* * * * *